(12) United States Patent
Feldman et al.

(10) Patent No.: US 8,483,364 B2
(45) Date of Patent: Jul. 9, 2013

(54) TELECOMMUNICATION SYSTEM FOR IMPROVING QUALITY OF SERVICE

(76) Inventors: Michael Feldman, Thornhill (CA); Alexander Feldman, Maple (CA); Boris Feldman, Thornhill (CA)

( * ) Notice: Subject to any disclaimer, the term of this patent is extended or adjusted under 35 U.S.C. 154(b) by 808 days.

(21) Appl. No.: 12/660,192

(22) Filed: Feb. 23, 2010

(65) Prior Publication Data

US 2011/0206188 A1 Aug. 25, 2011

(51) Int. Cl.
*H04M 1/24* (2006.01)
*H04M 3/08* (2006.01)
*H04M 3/00* (2006.01)

(52) U.S. Cl.
USPC ............... 379/2; 379/1.04; 379/9; 379/15.01; 379/134; 379/198

(58) Field of Classification Search
USPC ............ 379/1.01, 2, 8, 9, 9.06, 14.01, 10.01, 379/15.01, 29.01, 29.02, 32.01, 112.01, 112.09, 379/133, 134, 196, 198, 221.03, 221.04, 379/242
See application file for complete search history.

(56) References Cited

U.S. PATENT DOCUMENTS

| | | | | |
|---|---|---|---|---|
| 4,823,377 A * | 4/1989 | Sugiura et al. | ............... | 379/156 |
| 4,995,109 A * | 2/1991 | Arizumi et al. | .......... | 379/106.08 |
| 5,661,725 A * | 8/1997 | Buck et al. | ..................... | 370/377 |
| 5,740,236 A * | 4/1998 | Pruitt | ....................... | 379/201.03 |
| 5,999,617 A * | 12/1999 | Oyanagi et al. | ............. | 379/265.1 |
| 6,002,665 A * | 12/1999 | Choe | .............................. | 370/217 |
| 7,616,626 B2 * | 11/2009 | Ebisawa | ........................ | 370/357 |
| 2004/0174847 A1* | 9/2004 | Menon et al. | ................. | 370/328 |
| 2005/0117572 A1* | 6/2005 | Ebisawa | ........................ | 370/357 |
| 2012/0099714 A1* | 4/2012 | Hodge | ........................ | 379/88.16 |

* cited by examiner

*Primary Examiner* — Binh Tieu (57) ABSTRACT

Telecommunication system servicing a plurality of telecommunication interface lines that allows improving a service quality by keeping connection on these lines in the case of computer freezing and during to its restart (reboot).

20 Claims, 7 Drawing Sheets

FIG. 7

TELECOMMUNICATION SYSTEM FOR IMPROVING QUALITY OF SERVICE

CROSS-REFERENCE TO RELATED APPLICATIONS

This is the first application filed for the present invention.

TECHNICAL FIELD

The present invention relates to the field of telecommunications networks and more specifically to a apparatus and a method for robustness telecommunication system during temporary computer freezing or overloading.

BACKGROUND OF THE INVENTION

Today the majority of telecommunication systems dedicated for transmitting/receiving data or voice information are based on the personal computers or dedicated embedded computer systems. Those computers include one or more interface blocks connected to computer system (processor/control block) via a system bus (for example PCI, PCI express etc.).

PBX (Private branch exchange) can be a example of those telecommunication system. It allows connection between private organization (office, business etc.) to the PSTN (Public switched telephone network). The connection to PSTN or private organization can be via different interfaces includes analog telephone lines, ADSL, ISDN, T1, E1 etc.

Telecommunication systems are playing a very important role today. They allow voice/data connection between plurality clients around the world. Because of telecommunication system role today they have to meet special requirements for quality and robustness. A lot of engineering solutions are using for support those requirements.

U.S. Pat. No. 7,420,963 (Shanhar J. S., et al) describes an apparatus and a process of program testing an ERS (emergency response service) in a telephone-communication environment using processor means. This apparatus allows registering said responses, their processing and mapping a public emergency line to the test location.

U.S. Pat. No. 7,447,160 (Croak M., et al.) offers automating test procedure of EP systems by the injecting a plurality of test signaling error messages.

U.S. Pat. No. 6,630,963 (Ortiz H. B., et al) offers a system for monitoring electrical state of circuits in real time, but don't focus on the robustness of the interface operation.

U.S. Pat. No. 6,636,503 (Shiran M. G. et al) described communication system intended for serving of client-server architecture and using "watch dog" to detect a hang-up condition, to generate an alarm signal and can likewise reset communication server to avoid the telecommunications switch failure. This reset (reboot) function consequently disconnects all telecommunication interfaces and for example in case PBX will disabling phone service for a large number of users.

This condition when sometimes multiple of lines become physically disconnected may significantly impact the system operation on the next step. The case when all disconnected lines will try to establish connection again can cause overloading (bounce) of communication systems.

This bounce can significantly impact all emergency connections and real time communication.

From another side the time for restoring physical connection and the time for restoring connection on the protocol level is significantly more then the time that communication system needs for self repair or reboot.

Therefore, a need a method and apparatus that allows informing ("saying") clients about a state of the communication system, keeps all telecommunication interfaces physically connected during communication system internal restart (reboot) due internal failures. It allows preventing an unnecessary physical disconnection of communication interfaces and improving a robustness and quality of service.

SUMMARY OF THE INVENTION

The first aspect of the offered invention consists in that the telecommunication system comprises an Analyzer that analyzes failure condition or "freezing" of this telecommunication system and controls of the repairing said telecommunication system.

The second aspect consist in that this Analyzer can generate control signals that will initiate system repairing (including reset, reboot, reinitialization etc. of the telecommunication system) and control of the interface apparatus operation during system repairing.

The third aspect consists in that in case failure Analyzer indicate failure condition and initiate switching said interface apparatus to the "busy" state. During this state said interface apparatus can indicate to remote interfaces the "busy" state by sending alarms on the physical level or sending predetermined information (special patterns) on the protocol level or sending prerecorded voice messages.

The forth aspect consists in that said telecommunication system comprises a list of predetermined clients (addresses). Said system stores information that is transmitted to said clients (addresses) and addresses of sources of this information during to predetermined period (system restart or reboot), and after finishing this period its transmit this information to predetermined clients (from said predetermined list).

The fifth aspect consists in that said Analyzer can block the system interface between said interface apparatus and computer system during said "busy" state. Said Analyzer can wait acknowledge signal from the computer system that said system is ready for normal operation after repairing. In case that Analyzer receive this acknowledge signal from the computer system it can switch said interface apparatus operation mode from "busy" state to "normal operation" state.

The sixth aspect consists in that the requirement to inform ("saying") clients about a state of the communication system during communication system internal restart (reboot) because of internal failures are very important. Because if during internal restart (reboot) of said system all the physical connections and/or protocol connections without any data/voice communication to current clients will keep, said clients may interrupt communication by themselves and the benefits of the proposed system will be lost.

The seventh aspect consists in that said communication system includes an external interface that allows supporting redundant communication systems. In this case (redundant system) there is the second communication system that operates in the "IDLE" mode. This second system is able to replace first one and to continue operation in case the first system failures and/or can't be repaired. First communication system communicates with second one during normal operation via said external interface and informs second one when it can start to take over all connections and all information traffic. It can happen during the time that first system initially failed and doing restart (reboot) or when restart (reboot) doesn't help for repairing first system. During the time when the first system informing "saying" clients about a state of the communication system, second one can prepare itself to switching to the full operation mode.

The eighth aspect consists in that said communication system allows in "busy" mode transmit audio and/or video broadcast information that is receiving via audio and/or video tuner from external antenna or cable.

The ninth aspect consists in that said communication system can identify preferable language for transmitting in "busy" mode.

The tenth aspect consists in that said preferable language identification is based on the speech language identification, call zone recognition and/or predetermined setting.

BRIEF DESCRIPTION OF THE DRAWINGS

Further feature and advantage of the present invention will become apparent from the following detailed description, taken in combination with the appended drawings, in which.

DETAILED DESCRIPTION OF THE PREFERRED EMBODIMENT

Figure 1:
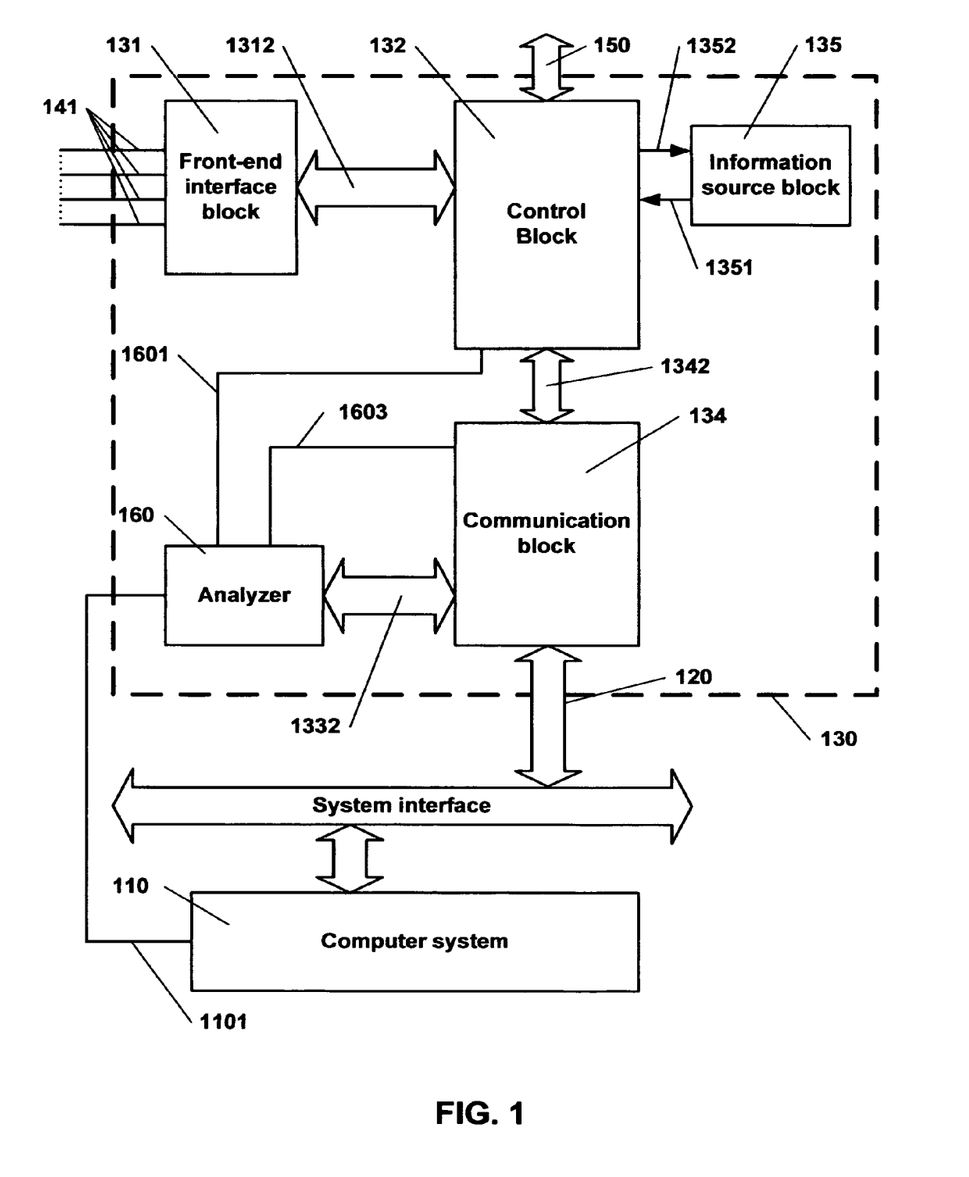
FIG. 1 shows an example of a telecommunication system according to the present invention.

FIG. 1 represents an example of a telecommunication system. This telecommunication system includes a computer system 110 and a peripheral block 130 connected via a system interface 120. Said peripheral block 130 includes a front-end interface block 131, a control block 132, an information source block 135, an analyzer 160 and a communication block 134. It is shown a plurality of telecommunication interface lines 141 that connect external serviced clients to the front-end interface block 131. This front-end interface block 131 is connected to the control block 132 via a bus 1312. Said control block 132 is connected to said computer system 110 via said communication block 134, the system interface 120 and said bus 1342 correspondently. The analyzer 160 is connected to control block 132 via bus 1601 and to communication block 134 via a bus 1603 and a bus 1332. This analyzer analyzes the conditions of the bus 120 and the state of computer system 110 correspondently. The computer system 110 may be connected to the analyzer 160 via bus 1101. The information source block 135 is connected to control block 132 via two busses 1351 and 1352. Said telecommunication system may have an external interface bus 150 connected to the control block 132 for increasing robustness of telecommunication system (for example, in case redundant telecommunication system).

As an example of said information source block 135 can be a radio tuner that directly connect via busses 1351 and 1352 to control block 132. This embodiment makes it possible even in case when said computer system 110 fails to transmit audio/data information to the physically connected lines (for example "music on hold" in case audio communication). This will inform clients that system cannot service (it is in "busy" state) and will ask its serviced client to "stay on the line". In this case clients will not disconnect communication during the time that computer system 110 needs for repair itself (restart). Another example of this information source block 135 can be ROM with prerecorded messages.

Various interfaces like T1, E1, J1, DS3, E3, ISDN, ADSL, analog telephone lines etc., can be used as said interface lines 141. These interfaces are characterized in that they have significantly high connection time on the physical and/or protocol levels. Any system interfaces like PCI, PCI-X, PCI express, VME, USB, Ethernet etc. can be used as said system bus 120.

The analyzer 160 analyses the state of said telecommunication system by continuous monitoring said system interface 120 via the system bus 1332 and said communication block 134. The failure condition detecting will trigger system repairing depends on the control setting (program) of the block 160. One of the examples of the possible failure condition can be absent acknowledge signals from the computer system 110 during to data transferring between control block 132 and computer system 110 (If the interface 120 is a PCI interface—the absence of the signal GNT# during to predefine specific time after the control block 132 has sent REQ# signal to computer system 110). Another example of the failure condition can be absent the interrupt acknowledge signal during to predefine period of time from the computer system 110 after the control block 132 has sent interrupt signal to it.

In the case that failure condition was "cached" by said Analyzer 160 it informs said control block 132 via said bus 1601 and said communication block 134 via said bus 1603. The control block 132 in this case switches from "normal" operation mode to "busy" operation mode. The communication block 134 after receiving signal 1603 may disconnect interface block from computer system. At the same time said analyzer 160 may inform the computer system 110 about failure condition via bus 1101 or via buses 1332 and 120. (As an example of bus 1101 implementation can be signal that can initiate the global "RESET" for restart said computer system 110).

The information that the computer system 110 finished repairing (restoration) itself may be send via bus 1101 to the analyzer 160 or buses 120 and 1332. The analyzer 160 then informs said control block 132 and said communication block 134 via buses 1601 and 1603 correspondently about this condition. In this case the control block 132 and the communication block 134 both switch from "busy" state to the normal operation state.

Figure 2:
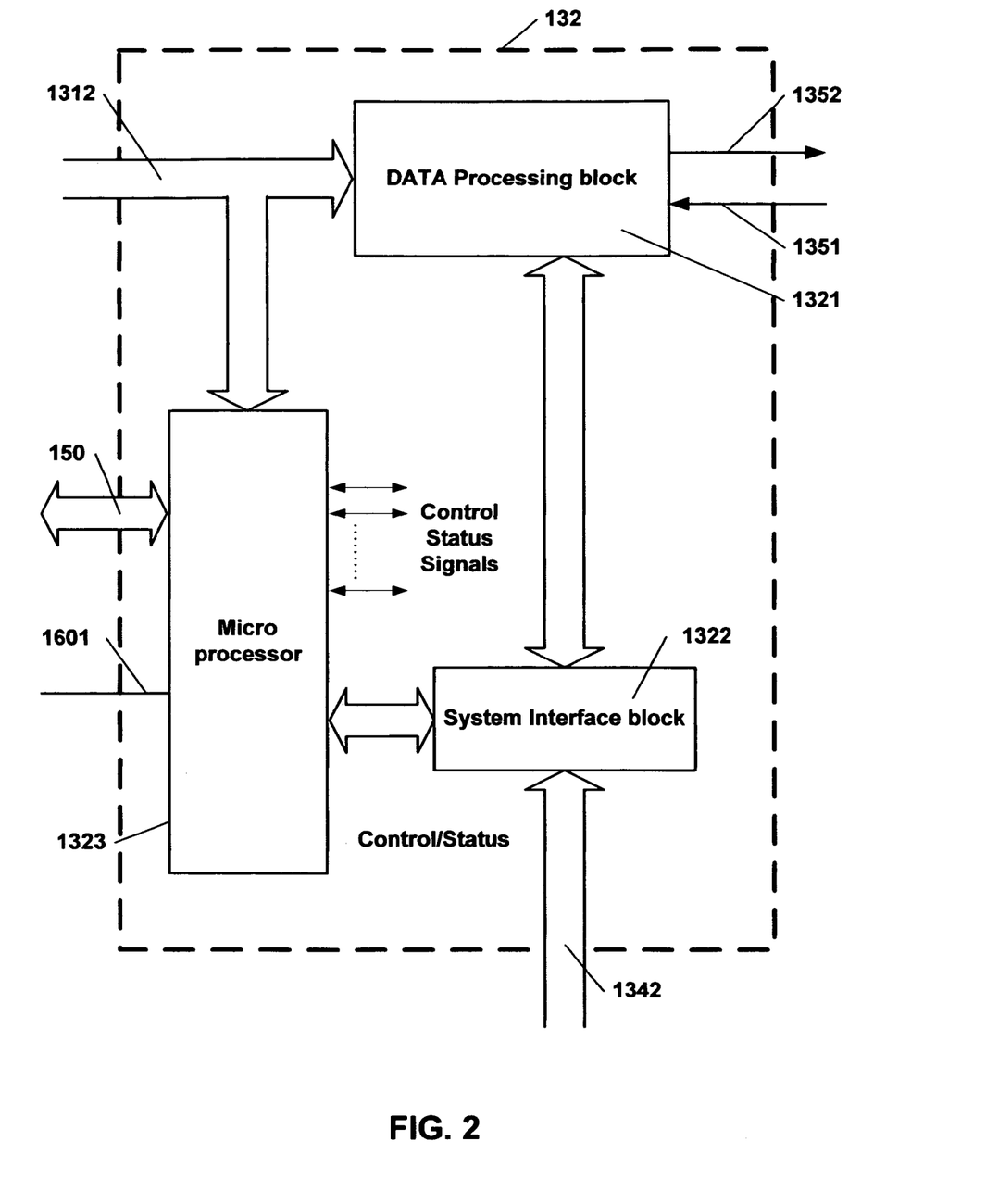
FIG. 2 shows the example of the control block structure.

FIG. 2 represents the control block 132. As an example, said control block 132 includes a data processing block 1321, a system interface block 1322, and a microprocessor 1323. Said control block 132 controls all functionality of the peripheral block 130. The transmit/receive information to/from front-end interface block 131 via bus 1312 moves through the control block 132 (and via said data processing block 1321) from/to computer system 110. The control block 132 keeps active telecommunication lines 141 (via front-end block 131) physically connected during normal communication. The control block 132 via bus 1601 informs said analyzer 160 about the status of the peripheral block 130 if it's necessarily. During failure condition of the computer system (the control block 132 getting an information from the analyzer 160 via bus 1601) the control block keeps lines 141 in the physical connection state, stops requesting to move information to/from computer system 110 via 1342 and 120 buses and starting transmitting information (that system 110 is on the "busy" state) to the clients via physically connected lines 141 from information source block 135 (via buses 1352 and 1351). When the analyzer 160 informs control block 132 about end of the repair interval (system restoration) the control block 132 stops sending "busy" information to the clients and switches to the "normal" operation mode. The external interface bus 150 connects to the microprocessor 1323 (it shown only in FIG. 1), and it is used for exchange control/status information in case for an example of a redundant telecommunication system.

Figure 3:
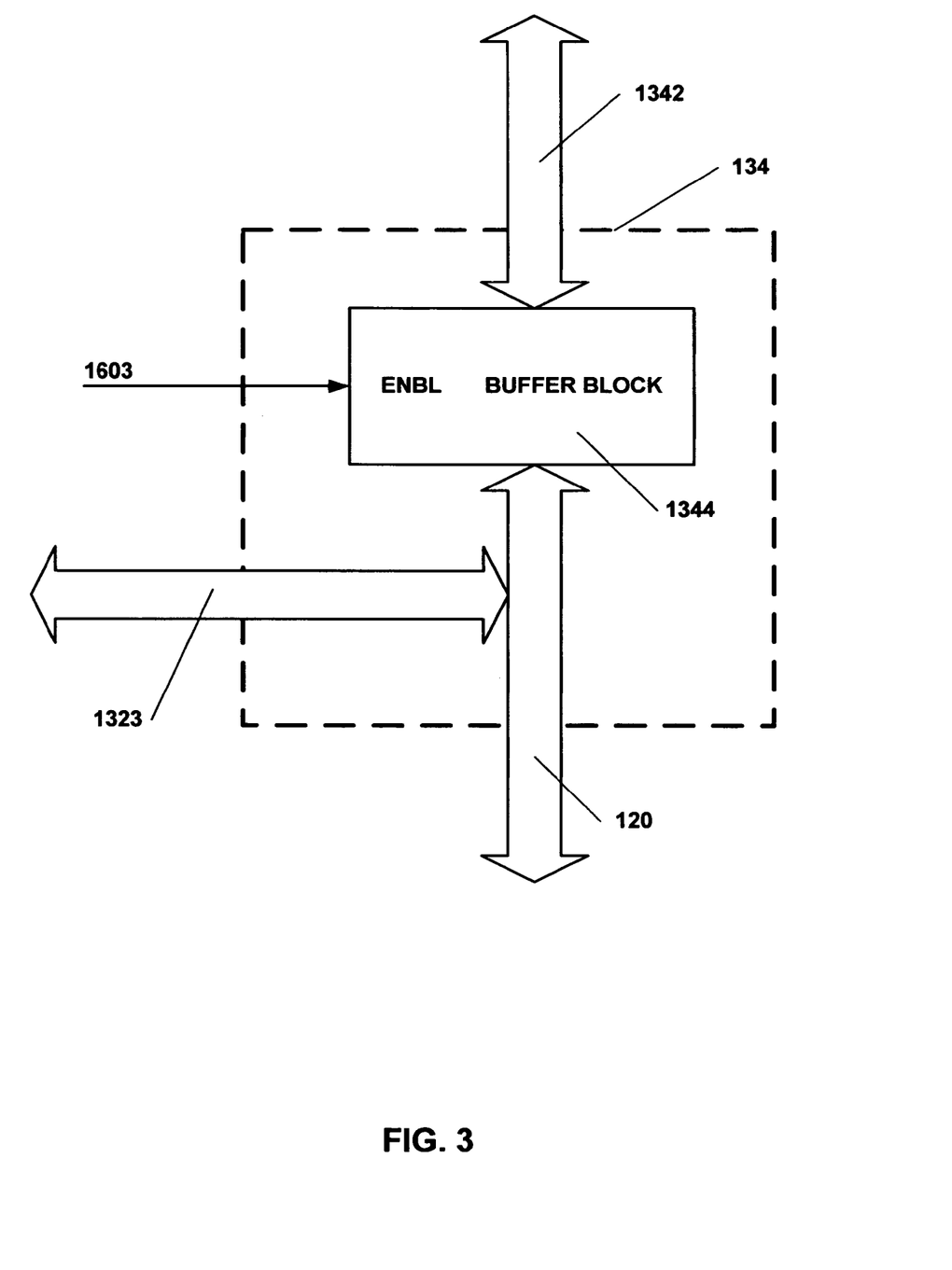
FIG. 3 shows the example of the communication block structure.

FIG. 3 represents an example of the communication block 134. This communication block 134 can be implemented as a buffer block 1344 between the system interface 120 and the bus 1342. The bus 1603 from the analyzer 160 connects to enable port of the buffer block 1344. The bus 1332 connects this analyzer 160 to system interface 120, for example. The bus 1332 can be incorporated all signals of the system interface 120 or part of it. Said analyzer 160 analyzes various conditions of said system interface 120 by analyzing signals on the bus 1332. In case of said failure condition the signal 1603 disconnect at least a part of signals of the interface 120 by transmitting these signals to the bus 1342 (or modify them). This part can include, for example, controlling signals.

Figure 4:
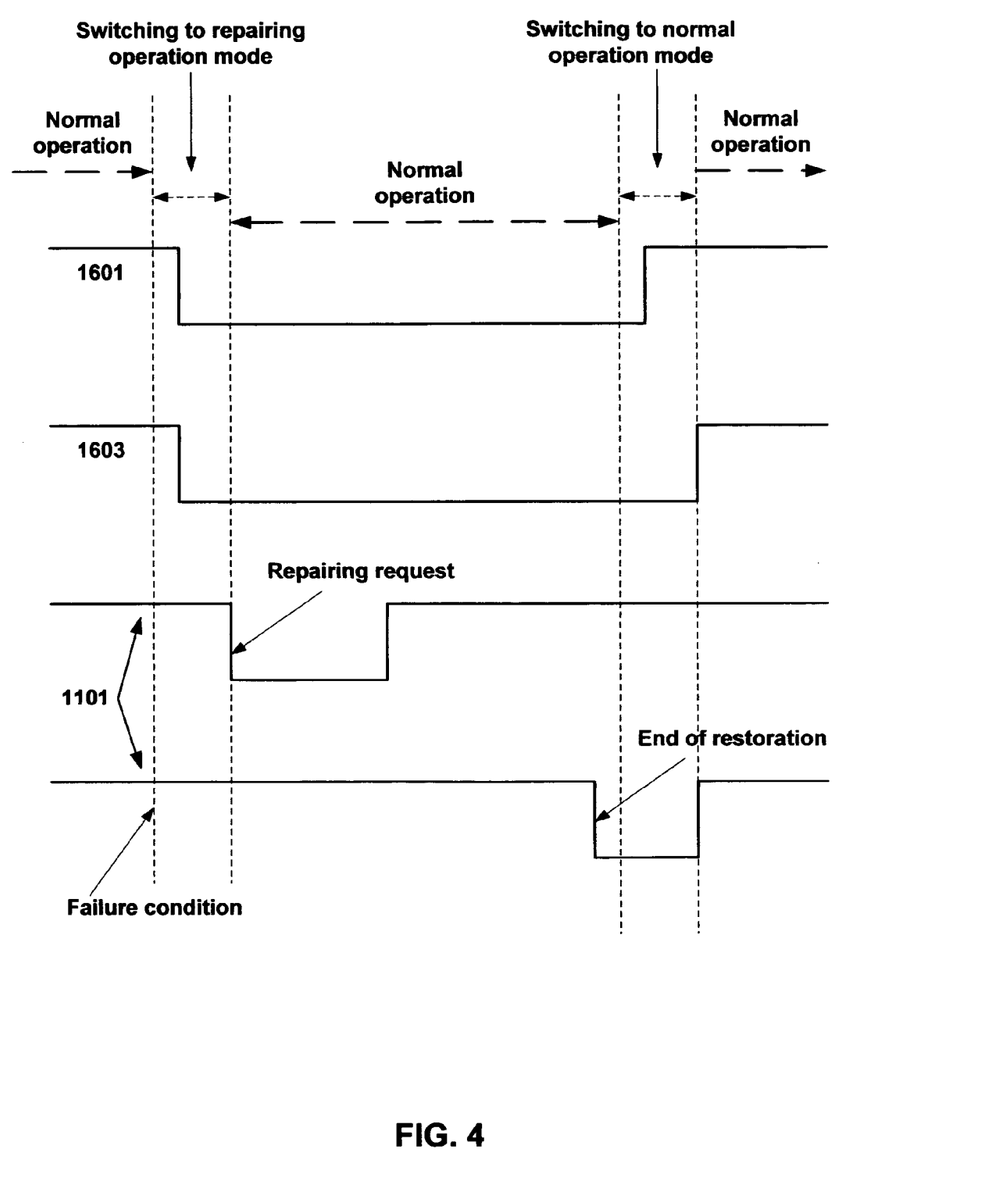
FIG. 4 shows the timing diagram describing the telecommunication system operation logic in the case of repairing.

FIG. 4 shows an example of the timing diagram describing the telecommunication system operation logic in the case of repairing (restoration system). The failure condition initiates falling edge on the bus 1601 and 1603. The analyzer switches the control block 132 (by signal 1601) and the communication block 134 (by signal 1603) to "busy" operation mode and sends the request repairing signal to computer system 110 via the bus 1101, for example. After restoration the computer system 110 sends signal "end of restoration" via bus 1101 or via system interface 120, for example. The analyzer 160 after receiving this signal from computer system 110 informs control block 132 and communication block 134 via buses 1601 and 1603 correspondently. After this the telecommunication system switches to the "normal" operation mode.

Figure 5:
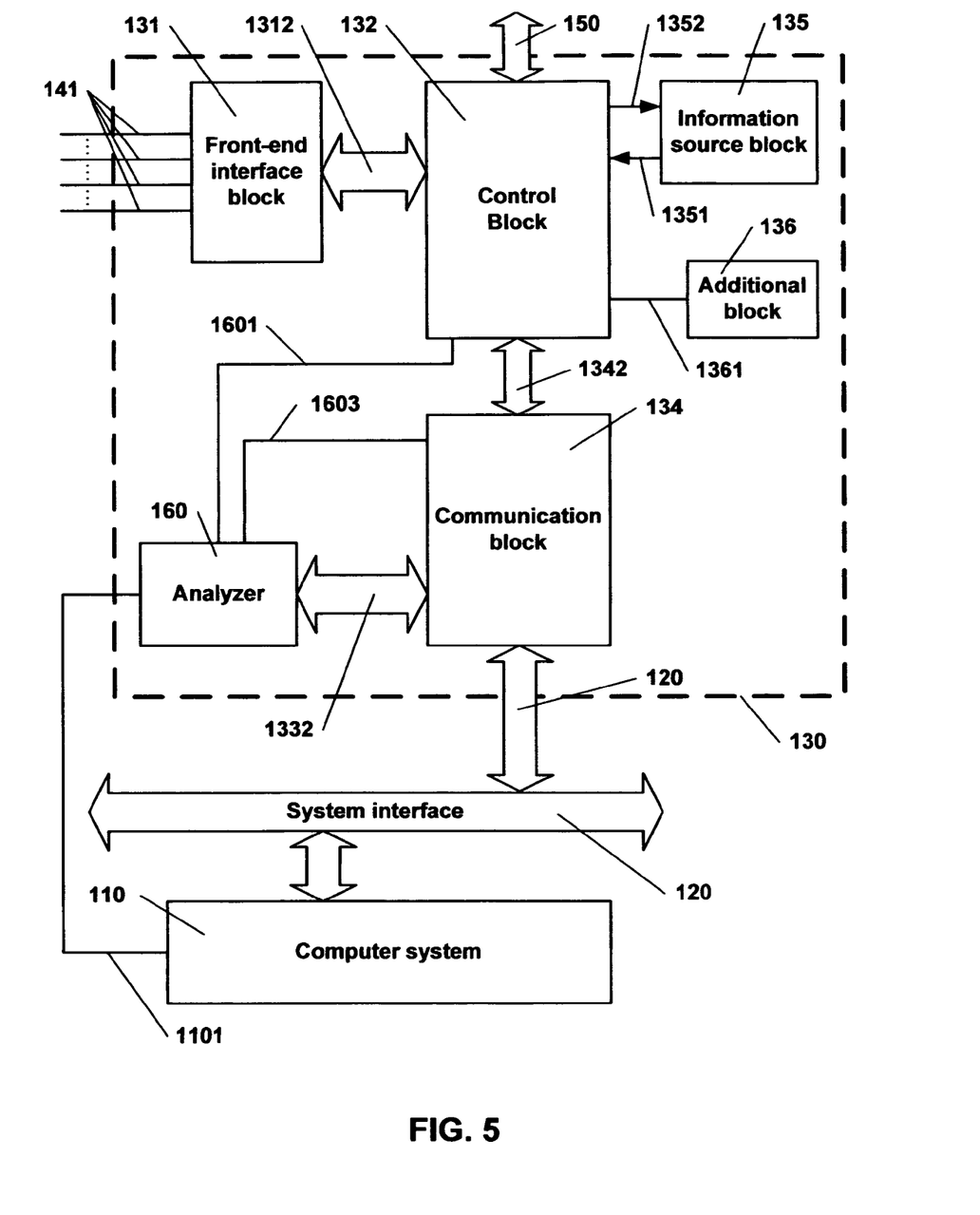
FIG. 5 shows second example of said telecommunication system using an additional block.

FIG. 5 represents an example of an advanced version of the peripheral block 130 that has additional functionality compare to original one on the FIG. 1. This version of the peripheral block 130 includes an additional block 136 that is intent to store the "specific" addresses of the clients (like emergency, police etc) and specific operation algorithms dedicated for operation with those clients during computer system "busy" operation mode via bus 1361. If said peripheral block 130 switches to the "busy" operation mode and front-end interfaces block 131 receive information from predetermined list of "specific" addresses, the control block 132 can stores this information in block 136 via bus 1361 for future analyze and use.

The peripheral block 130 that comprises said front-end interface block 131, said control block 132, said communication block 134, said analyzer 160, the information source block 135 and the additional block 136 can be implemented, for example, in the form of a microprocessor. These blocks can be integrated so that, for example, a common memory can be used by different blocks.

If said "busy" operation mode remains longer than a predetermined time then all clients that are waiting to continue their communication can get the updated information about the system status.

Figure 6:
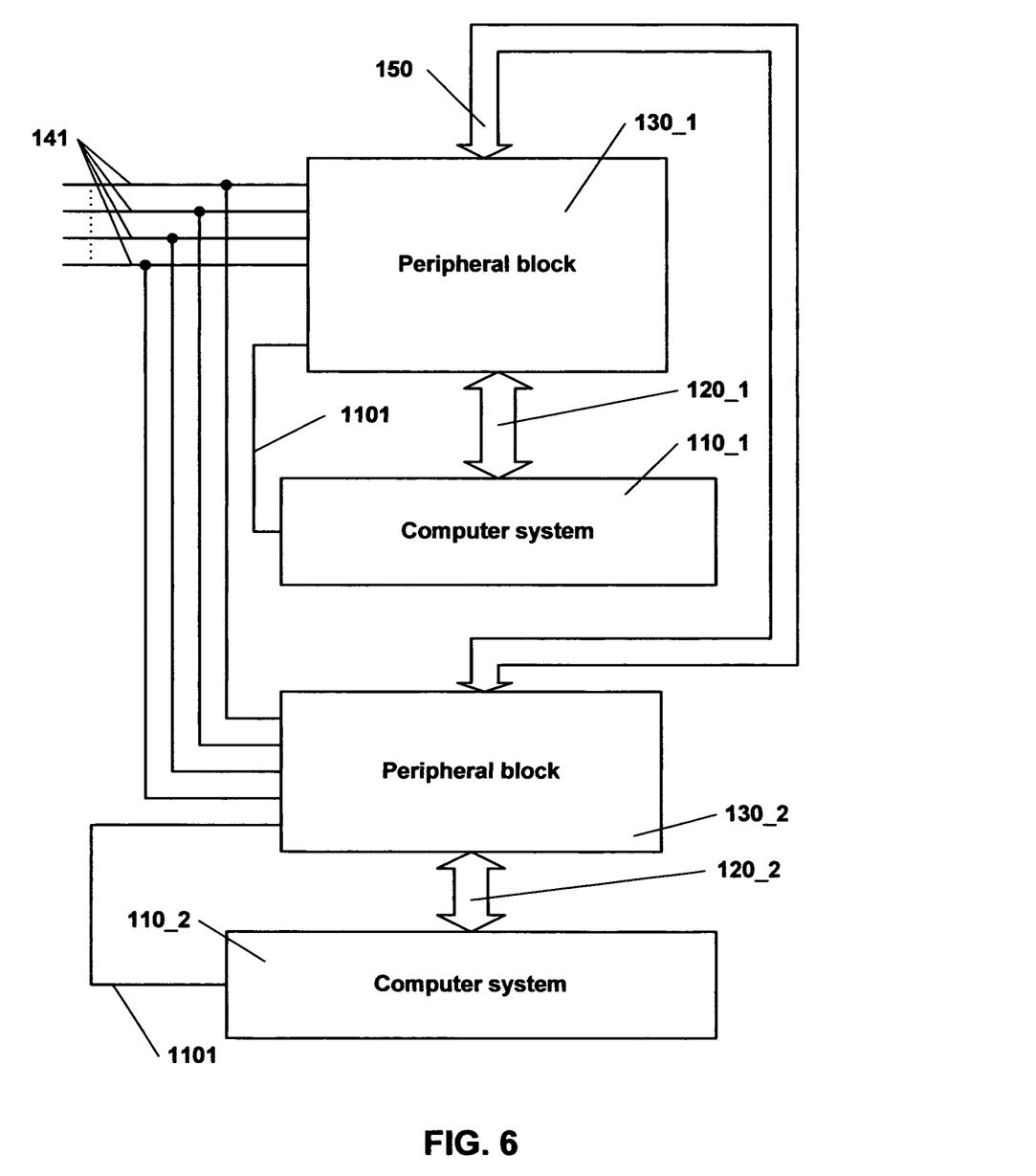
FIG. 6 shows the example of redundant telecommunication system using an external interface.

FIG. 6 represents an example of redundant telecommunication system based on the two ordinary telecommunication systems. The first telecommunication system includes peripheral blocks 130_1 and computer system 110_1, and second telecommunication system includes peripheral blocks 130_2 and computer system 110_2 correspondently. Each of said peripheral blocks 130_1 and 130_2 unites said front-end 131, the control block 132, said analyzer 160 and said communication block 134 correspondently (as in FIG. 1). The information source block 135 can be included into said peripheral block, but not necessarily. The external interface bus 150 connects both said peripheral blocks 130_1 and 130_2 together. The interface lines 141 are connected to the both peripheral blocks 130_1 and 130_2 in parallel. The "spare" peripheral block 130_2 in the "normal" operation mode only receives information from interface lines 141. The "main" peripheral block 130_1 is operating in the "normal" operation mode and can exchange status information with "spare" peripheral block 130_2 via external bus 150. In case when "main" peripheral block 130_1 switches to the "busy" mode the status information will be send to the "spare" peripheral block 130_2, and the redundant system will going to operate as described in the paragraph [0020]. Ports for connecting said external interface 150 inside peripheral blocks 130_1 and 130_2 are not shown. The second telecommunication system (spare system) can include or not include said analyzer and communication block and corresponding buses.

Figure 7:
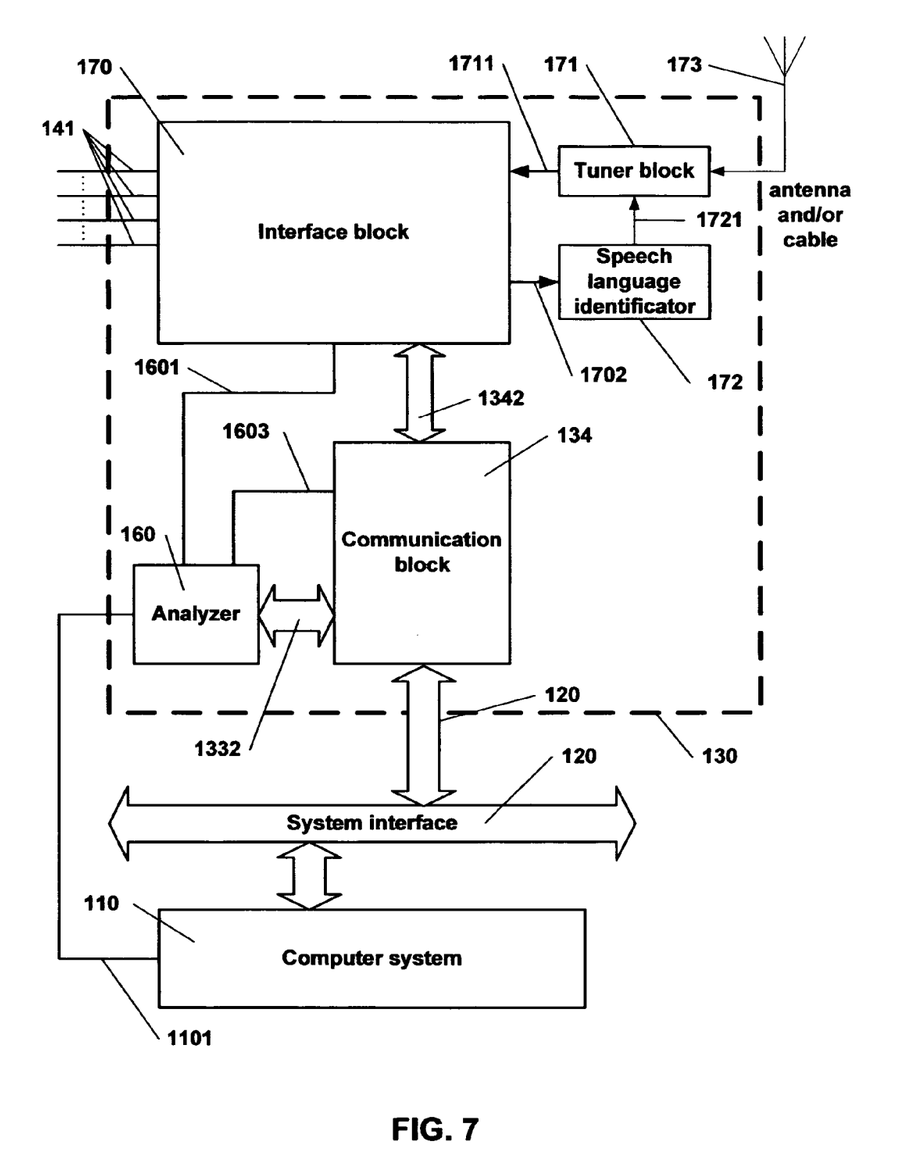
FIG. 7 shows another example of improved telecommunication system.

FIG. 7 represents another example of improved telecommunication system. This telecommunication system includes a computer system 110 and a peripheral block 130 connected together via system interface 120. Said peripheral block 130 includes a interface block 170 (combining said front-end and said control blocks), a tuner block 171, a language analyzer 172, an analyzer 160 and a communication block 134. It is shown a plurality of telecommunication input interface lines 141 connected to the interface block 170 (as in FIG. 1). Said interface block 170 is connected to said computer system 110 via said communication block 134, a bus 1342 and via said system interface 120. The analyzer 160 is connected to said interface block 170 via bus 1602 and to communication block 134 via the bus 1603 and the bus 1332. This analyzer analyzes the conditions of the bus 120 and the state of computer system 110. The computer system 110 is connected to the analyzer 160 via bus 1101. The tuner block 171 is connected to interface block 170 via bus 1711. The input of said language analyzer 172 is connected to the interface block 170 via bus 1702 and the output of said language analyzer 172 is connected to the tuner block 171 via a bus 1721. Said tuner block 171 has connection to the external antenna and/or cable 173.

This example of said telecommunication system allows to transmit auxiliary information (text, music in the "busy" mode) to the input lines that already have connected and allows to choose preferable language of said information. This language can be previously defined. This language can be set on the base of telecommunication zone address (the main language for to each address zone). The speech language identificator 172 can identify corresponding language based on statistical models (auto regression or other) and turns on corresponding channel of tuner block 171 (through 1721 bus). Said tuner block 171 can receive transmitted information from corresponding radio (TV) station from the antenna (or cable) 173 to the input interface lines 141.

All real statistical models allow to identify used language with some reliability and require significant number of sound phonemes for analyze. On real system can be used combination of strategies for language recognition.

We claim:

1. An improved telecommunication system, comprising:
   a computer system connected to a system interface,
   a front-end interface block,
   a plurality of input interface lines, each of which connects corresponding clients to said front-end block,
   a commutation block, a control block that is connected to said front-end block directly and to said system interface via said communication block, an analyzer connected to said control block, to said computer system and to said commutation block;

said telecommunication system, wherein:

said control block and said communication block are characterized in that they have two operation mode:

a "normal" mode and a "busy" mode, and they can be transferred from one mode to another and back under the control of said analyzer;

said analyzer is capable:

to analyze the signals transmitted by said system interface, and in the case if said analyzer detects predetermined failure condition, to switch said communication and control blocks from the "normal" operation mode to the "busy" mode, to control directly operation of said computer system, to return said communication and control blocks from "busy" mode to "normal" mode after analyzing signals of the system interfaces;

said communication block is capable to block transmit/receive operation between said system interface and said control block.

2. The telecommunication system according to claim 1, wherein said analyzer is capable to return said communication and control blocks from "busy" mode to "normal" mode after receiving signal from said computer system directly.

3. The telecommunication system according to claim 1, wherein said predetermined failure condition is chosen from at least the following conditions:

timeout,
wrong timing,
high data error rate,
their combinations.

4. The telecommunication system according to claim 1, wherein at least one of the lines from said plurality of input interface lines is following:

T1, E1, J1, DS3, E3, ISDN, ADSL, analog telephone line and fiber.

5. The telecommunication system according to claim 1, comprising an information source block intended for transmission predetermined information via said plurality of input interface lines, said information source block is connected to said control block and is a source of predetermined information, and said predetermined information can comprise the following: music messages, text messages, digital information, their combinations.

6. The telecommunication system according to claim 1, wherein an output of said analyzer is connected to the input of said computer system for switching this telecommunication system to the power down or low power mode in the case of detection of said predetermine failure condition.

7. The telecommunication system according to claim 1, comprising an additional block, said additional block is connected to said control block, and said additional block is capable:

to analyze addresses of all incoming serviced requests,
to compare with predetermined list of important addresses, and in the case of coincidence
to receive and to store transmitted information.

8. The telecommunication system according to claim 7, wherein said additional block is a language analyzer, said language analyzer allows to make decision about preferable language for said predetermined messages that are transmitted per said input interface lines.

9. The telecommunication system according to claim 1, wherein said control block comprises a port for connecting an external interface bus, said external interface bus allows to connect said telecommunication system to at least one an additional telecommunication system and in the case of detecting said predetermined failure condition to transfer the service of already connected clients to said additional telecommunication system.

10. A method for improving services in the telecommunication system, said telecommunication system is intended for exchange of information between remote clients and computer system and comprises:

a computer system connected to a system interface,
a front-end interface block connected to a plurality of interface lines connected to said clients,
a communication block,
a control block that is connected to said front-end block directly and to said system interface via said communication block;

said method, comprising:

operating in a "normal" mode,
operating in a "busy" mode,
switching from "normal" operation mode to "busy" operation mode in case of detecting predetermined failure condition on said system interface,
switching from "busy" operation mode to "normal" operation mode after receiving acknowledge from said computer system;

said method in case of said "normal" mode of operation, comprising:

servicing connections and information exchange between clients connected to this telecommunication system by said interface lines and/or said system interface,
monitoring said system interface with the help of an analyzer connected to said communication block;

said method, in case of said "busy" mode of operation, comprising:

blocking transmit/receive operation between said system interface and said control block,
sending request to said computer system for repairing,
keeping connections on said input interface lines on which connections were established before said failure condition was detected,
transmitting predetermined information to said input interface lines on which connections exist,
waiting a predetermined acknowledge from said computer system about end of repairing.

11. The method according to claim 10, wherein said monitoring detects at least following predetermined failure conditions:

timeout,
wrong timing,
high data error rate,
their combinations.

12. The method according to claim 10, wherein said monitoring detects following predetermined acknowledge that can be chosen from followings:

stop detecting of said predetermined failure condition,
detecting predetermined condition on said system interface,
receiving signal directly from said computer system,
their combinations.

13. The method according to claim 10, wherein at least one of the lines from said plurality of said input interface lines is following:

T1, E1, J1, DS3, E3, ISDN, ADSL, analog telephone line and fiber.

14. The method according to claim 10, comprising in case then said monitoring doesn't detect expected predetermined acknowledge longer then predetermined time following steps:
- disconnecting all said input interface lines,
- switching said telecommunication system into power down or low power mode, and
- in case of said telecommunication system is a redundant telecommunication system, said method comprises:
- sending request for transferring service functions to spare telecommunication system.

15. An improved telecommunication system, comprising:
- a computer system connected to a system interface,
- an interface block connected to said system interface directly or via a communication block,
- a plurality of input interface lines, each of which connects corresponding clients to said interface block,
- a radio and/or television tuner block comprising means for receiving radio and/or video information, and an output of said tuner block is connected to said interface block for transmitting said radio and/or video information to said clients via said input interface lines;

said telecommunication system, wherein:
- said interface block is characterized in that it has two operation modes: a "normal" mode and a "busy" mode, and it can be switched from one mode to another by said computer system or an external signal,
- said interface block in "normal" mode is capable to exchange information between said input interface lines and said computer system, and between said input interface lines themselves,
- said interface block in "busy" mode is capable to keep connection on the already connected input interface lines and to transmit information via said input interface lines from said tuner block,
- said means for receiving external radio and/or video information comprises an antenna and/or television cable.

16. The telecommunication system according to claim 15, comprising an analyzer, and said communication block, said analyzer is connected to the said system interface via said communication block, and said analyzer is connected to said interface block, said telecommunication system, wherein:
- said communication block is characterized in that it has two operation modes: a "normal" mode and a "busy" mode, and it can be switched from one mode to another by said computer system or an external signal,
- said communication block in "normal" mode is capable to exchange information between said interface block and said system interface,
- said communication block in "busy" mode is capable to block transmit/receive operation between said system interface and said interface block;

said telecommunication system, wherein said analyzer is capable to generate said external signal for switching from said "normal" to "busy" mode in case of detection of at least following failure conditions:
- timeout,
- wrong timing,
- high data error rate,
- their combinations;

said telecommunication system, wherein said analyzer is capable to return said communication and said interface blocks from "busy" mode to "normal" mode after analyzing signals on said system interfaces or receiving direct signal from said computer system.

17. The telecommunication system according to claim 16, wherein said transmit/receive information between said analyzer and said computer system can be chosen from followings:
- request to restart (reboot) said computer system,
- request to switch said computer system to power down or low power mode,
- request to switch said interface block from "busy" to "normal" mode.

18. The telecommunication system according to claim 15, wherein at least one of the lines from said plurality of input interface lines is following:
T1, E1, J1, DS3, E3, ISDN, ADSL, analog telephone line and fiber.

19. The telecommunication system according to claim 15, wherein said tuner block is multichannel, and said telecommunication system comprises a speech language identificator,
- an input of said speech language identificator is connected to said interface block, and an output of said speech language identificator is connected to said tuner block;
- said speech language identificator is capable to make decision which language is preferable for each of the connected input interface line, and based on this decision said tuner block transmits corresponding information to said input interface lines in "busy" mode.

20. The telecommunication system according to claim 19, wherein said speech language identificator is capable to make decision what language is preferable for each connected input interface line, using one of following strategies for choosing language (or for corresponding setting of said tuner block):
- predetermined setting,
- call zone recognition,
- speech language identification on the base of statistical models,
- their combination.

* * * * *